United States Patent [19]

Mödinger et al.

[11] Patent Number: 5,524,833
[45] Date of Patent: Jun. 11, 1996

[54] SEAT BELT RETRACTOR

[75] Inventors: Thomas Mödinger, Alfdorf; Johannes Schmid, Schwäbisch Gmünd, both of Germany

[73] Assignee: TRW Repa GmbH, Alfdorf, Germany

[21] Appl. No.: 315,588

[22] Filed: Sep. 30, 1994

[30] Foreign Application Priority Data

Oct. 4, 1993 [DE] Germany .......................... 43 33 760.0

[51] Int. Cl.⁶ ................................ B60R 22/405
[52] U.S. Cl. ................. 242/379; 242/382.6; 242/383.4; 242/384.2
[58] Field of Search ................. 242/379, 379.1, 242/383, 383.1, 383.2, 383.3, 383.4, 383.5, 384–384.6; 280/806, 807; 297/475–478

[56] References Cited

U.S. PATENT DOCUMENTS

| | | | |
|---|---|---|---|
| 3,074,761 | 1/1963 | Ryan | 242/382.6 |
| 3,226,053 | 12/1965 | Petty | 242/384.4 X |
| 3,405,953 | 10/1968 | Karlsson | 242/384.3 X |
| 3,471,100 | 10/1969 | Arcari | 242/383 |
| 3,722,824 | 3/1973 | Hayashi | 242/384.6 X |
| 3,787,002 | 1/1974 | Hayashi et al. | 242/384 |
| 4,164,337 | 8/1979 | Blom | 242/384.5 X |

FOREIGN PATENT DOCUMENTS 3244204  5/1984  Germany .

Primary Examiner—John M. Jillions
Attorney, Agent, or Firm—Tarolli, Sundheim, Covell, Tummino & Szabo

[57] ABSTRACT

A belt retractor for vehicular seat belt restraining systems is equipped with a novel housing structure. The load-bearing part of this housing comprises a shell section (10) surrounding the locking toothings (26a, 28a) on the circumference of the flanges of the belt reel (18) and the end pieces of which are located one on the other and secured together to form a base plate. Under a high load only tensile forces occur substantially in the shell section (10), whereby the shell section (10) surrounding the locking toothings (26a, 28a) acts as a band brake, thereby relieving the load on the locking pawls (22, 24).

14 Claims, 2 Drawing Sheets

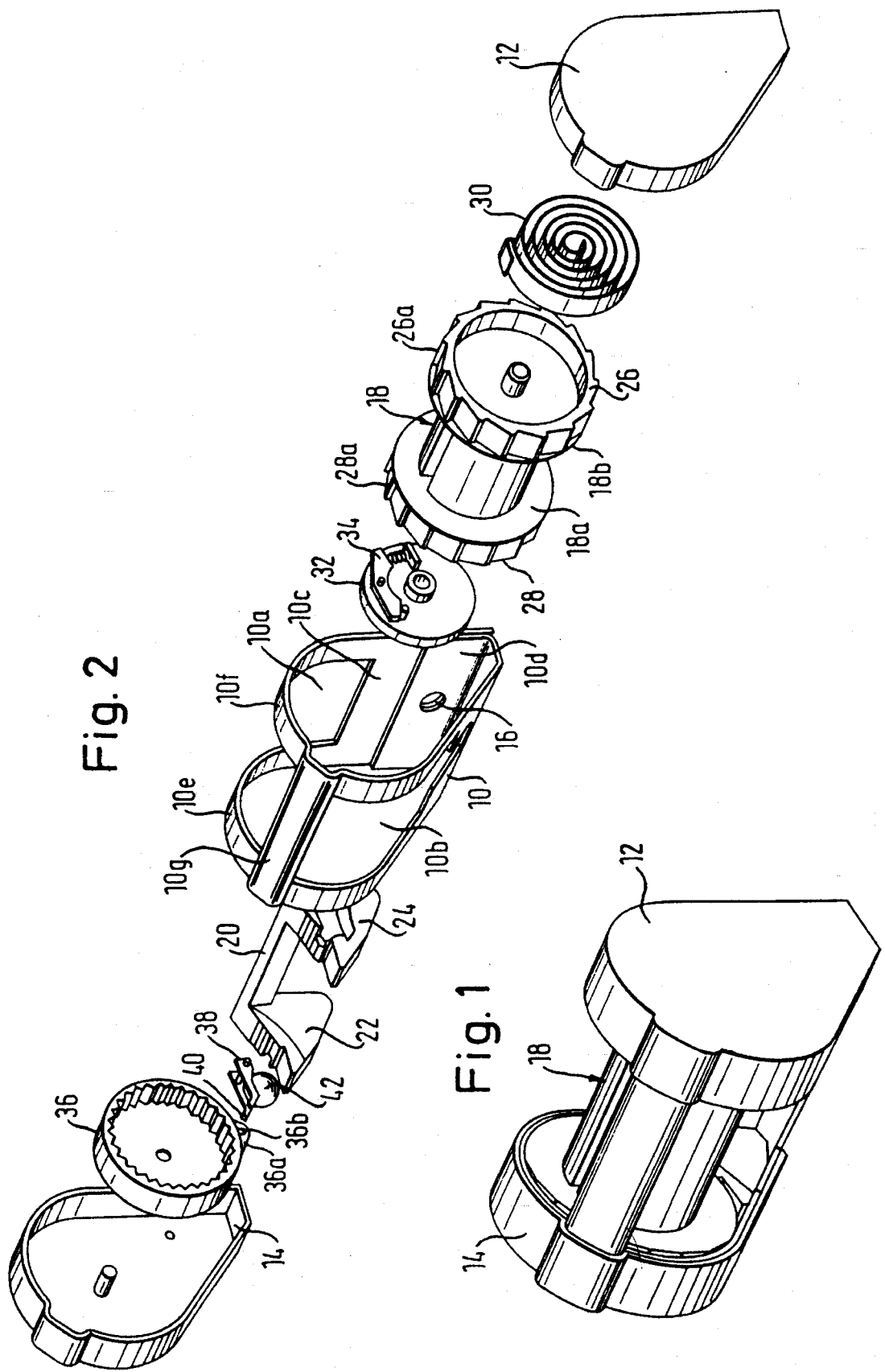

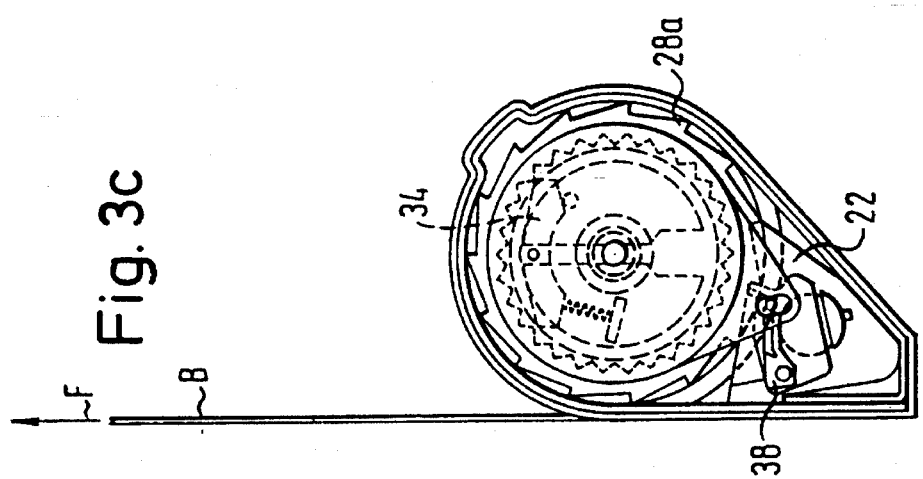
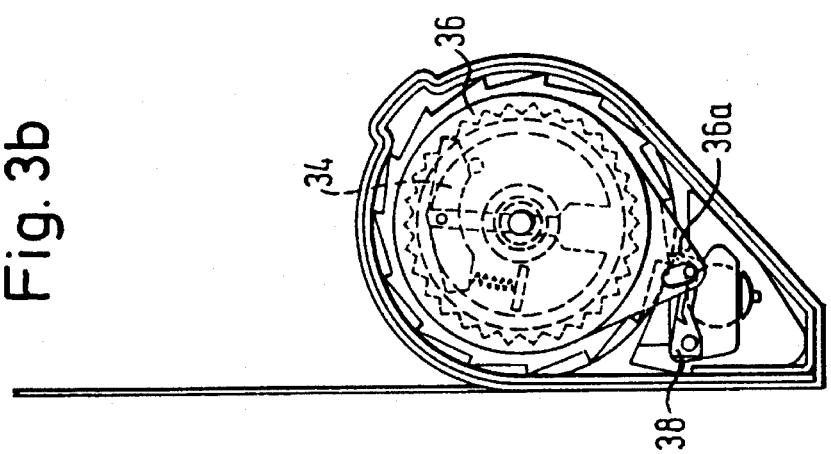
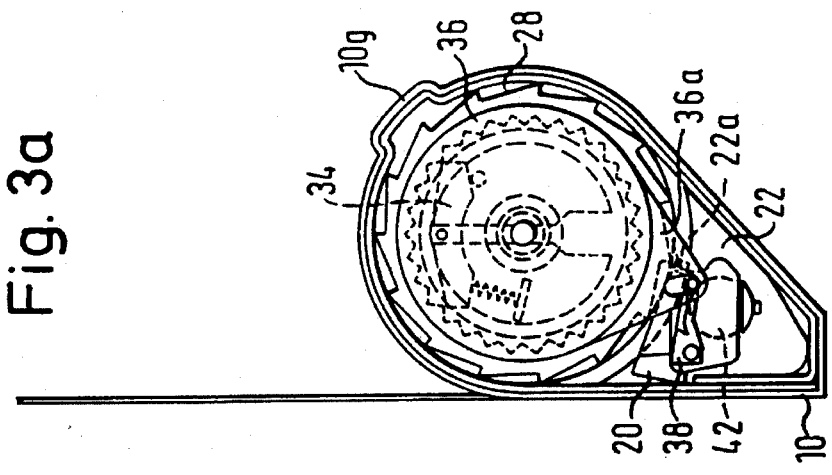

SEAT BELT RETRACTOR

The invention relates to a belt retractor for vehicular seat belt restraining systems having a housing to be secured to the body of the vehicle by means of a base plate, a belt reel being rotatably mounted in said housing and the flanges of said belt reel being each provided with a locking toothing.

Belt retractors for vehicular restraining systems are known in numerous variants. Widely spread is a type having a load-bearing frame formed of a stamped U-shaped steel plate. Between the two parallel legs of the frame the belt reel is rotatably mounted. The frame is secured to the vehicle on a base plate joining the two legs of the frame, this base plate being formed with an eyelet. In the restraining condition the frame is required to take not only the load exerted by the seat belt but also the forces materializing when the belt reel is prevented from rotating and to transfer these forces to the body of the vehicle via the base plate. To satisfy this requirement use is made of a steel plate having a thickness of 2 mm and more in producing the frame. Such dimensioning results in high weight and material expense.

Since there is a need generally in automative engineering to save weight and material, conventional designs of belt retractors have lightening holes in the areas of the frame which are not subjected to high loading as a result of the geometry concerned. Despite this, the frame contributes to a major extent to the overall weight of the belt retractor. The present invention provides a belt retractor for vehicular restraining systems which as compared to conventional types exhibits a significantly reduced weight and is of a compact design especially in the axial direction of the belt reel. In the belt retractor according to the invention at least one band-shaped shell section of the housing is connected to the base plate thereof, said shell section and base plate forming a closed loop surrounding the locking toothings provided on the circumference of the flanges. The belt retractor according to the invention thus departs from the prior art approach of employing a U-shaped frame. Instead, the belt reel is enveloped at its locking toothing by a load-bearing shell section of the housing. This shell section is subjected substantially to tension only when under load. It is generally appreciated in engineering that components of a given thickness withstand substantially higher tensile than compressive loading. Under high tensile loading the band-shaped shell section of the housing enveloping the locking toothings of the belt reel is caused to retract and come into contact with the locking toothings. Since the shell section in this condition is supported by the flanges of the belt reel it is unable to deform any further. With increasing load the band-shaped shell section of the housing is forced harder against the outer circumference of the locking toothings, this having the effect of a band brake, assisting the blocking action of the belt reel. The locking pawls provided for blocking the belt reel, like those of the locking toothings with which they interact, are subjected only to moderate loading and can thus be fabricated of plastic so that high weight savings are achieved.

In the belt retractor according to the invention high tensile stresses occur substantially in the band-shaped shell section only at the two edge webs located axially outwards, opposite the locking toothings. In one advantageous embodiment the middle part of the band-shaped shell section is substantially recessed so that two strips materialize spaced away from each other in the axial direction of the belt reel, the ends of said strips being connected to the base plate.

One particularly convenient embodiment, suitable for mass-production of the retractor housing, is achieved by fabricating the band-shaped shell section from a single piece of sheet metal, stamped and bent accordingly, the ends of which are placed one on the other and secured together to form the base plate.

In this preferred embodiment the interior space surrounded by the band-shaped shell section of the housing is made up of a cylindrical part in which the belt reel is accommodated and a generally prism-shaped part located on the circumference of said cylindrical part, said prism-shaped part swivably accommodating the locking pawls. When the belt reel is blocked under load the locking pawls are supported by the inside surface of the shell section surrounding them. Here too, the thereby resulting supporting forces are essentially converted into tensile stressing of the band-shaped shell section of the housing.

According to a further advantageous embodiment the axial ends of the shell section of the housing are each terminated by a fitted cap. Between these caps both the belt reel and the locking pawls are mounted for freedom of movement. The fitted caps are able to substantially contribute to the load bearing capacity of the housing since they grip by their circumferential edges the band-shaped shell section of the housing in areas which are exposed to highest loading. These circumferential sections of the fitted caps are also subjected substantially to tensile loading when stressed.

An embodiment which is particularly space-saving in the axial direction of the belt reel results when the locking toothings are formed on the outer circumference of each of a pair of rings applied to the outside of the corresponding flange and in which each ring surrounds a cylindrical space in which functional parts of the belt retractor are accommodated. For example, in the one cylindrical space within the ring the retractor spring can be accommodated and in the other cylindrical space the functional components of the belt-sensitive controlling mechanism are housed.

Further features and advantages of the invention will be appreciated from the following description of an embodiment and from the drawing to which reference is made and in FIG. 1 is a perspective view of the belt retractor;

FIG. 2 is an exploded view of the belt retractor shown in FIG. 1; and

FIG. 3a, b and c are schematic side views of the belt retractor to illustrate the locking function.

FIG. 1 provides a direct indication of how compact the belt retractor is. The load-bearing housing of the belt retractor is formed from a band-shaped shell section 10 forming a closed loop and two caps 12, 14 fitted to the two axial ends of the shell section 10. The shell section 10 is fabricated of an elongated, rectangular-shaped piece of sheet metal, in the middle area of which two weight-reducing windows 10a, 10b are provided and the two end pieces 10c, 10d of which are located one on the other and connected together. These end pieces 10c, 10d located one on the other form a securing or base plate having a through-hole 16 for receiving a securing screw. The strips 10e, 10f formed by the windows 10a, 10b are connected together and spaced away from each other by a web 10g. This web 10g is located roughly diametrally opposed to the base plate formed by the end pieces 10c, 10d.

The band-shaped shell section 10 of the housing surrounds a belt reel 18 which is rotatably mounted in the side fitted caps 12, 14. The interior space of the housing surrounded by the shell section 10 comprises a cylindrical space in which the belt reel 18 is accommodated and a generally prism-shaped space adjoining the circumference of said cylindrical space whereby two locking pawls 22, 24 rigidly connected to each other by a web 20 are accommodated in said prism-shaped space. The latter is formed between the two interconnected pieces 10c, 10d of the shell-shaped section. The locking pawls 22, 24 are swivably mounted in the caps 12, 14.

All functional components of the belt retractor are accommodated in the space formed by the shell section 10 and the caps 12, 14. The axial size of the belt retractor is dictated by the belt reel 18, the flanges 18a, 18b of which each carry a ring 26, 28 oriented outwardly. On the outer circumference of the rings 26, 28 locking toothings 26a and 28a are formed. Within each of the rings 26, 28 a cylindrical space is defined to receive the functional parts of the belt retractor. In the space surrounded by the ring 26 a coil-shaped retractor spring 30 is arranged. In the opposing cylindrical space surrounded by the ring 28 a belt-sensitive controlling mechanism for the locking pawls 22, 24 is accommodated. This controlling mechanism comprises a control disk 32 connected non-rotatably to the belt reel 18, on the side of which facing the belt reel 18 a coupling pawl 34 is swivably mounted at its center of gravity, and an inwardly toothed coupling gearwheel 36 surrounding said control disk. The gearwheel is coupled in rotation to the belt reel 18 when the coupling pawl 34 engages said inward toothing. On its outer circumference the coupling gearwheel 36 carries a projection 36a in which a weight-reducing slot 36b is formed. In this slot 36b a pin 40 extending from one side of a control pawl 38 engages. The control pawl 38 is swivably mounted in a side cavity of the locking pawl 20, resting on top of a sensor ball 42 which the same as said control pawl 38 is a component of a vehicle-sensitive actuating mechanism. The tip of the control pawl 38 protrudes through a window 22a on the side of the locking pawl 22 located opposite the locking toothing 28a in the assembled condition of the belt retractor. The control pawl 38 is thus able to interact with the locking toothing 28a in vehicle-sensitive means.

To produce the belt retractor the windows 10a, 10b and the through-openings 16 are stamped from a piece of sheet metal which is thin as compared to the material employed in conventional belt retractors. The stamped piece of metal is then rolled into the desired shaped as evident from FIG. 2, the web 10g preferably receiving a channel-shaped section. The end pieces 10c, 10d located one on the other are connected together for instance by spot welding. The belt reel 18 is formed integral with the flanges 18a, 18b and the rings 26, 28 provided with the locking toothings 26a, 28a. As directly evident from FIG. 2 all functional parts of the belt retractor can be assembled in the axial direction, before assembly is completed by fitting the caps 12, 14 also in axial direction.

In vehicle-sensitive actuation the control pawl 38 is lifted by the sensor ball 42 to engage with the locking toothing 28a. Rotation of the belt reel 18 in the uncoiling direction causes a pressure to be exerted on the control pawl 38 which is transmitted to the locking pawl 22. The latter is thus swivelled so that its tip also engages the locking toothing 28a. Due to the web 20 the locking pawl 24 is moved in synchronism to simultaneously engage the locking toothing 26a. Positioning of the locking pawls 22, 24 automatically occurs in synchronism with rotation of the belt reel 18, since the locking pawls 22, 24 are both moved via the control pawl 38 with rotation of the belt reel 18, thus safely excluding collision of the tips of the locking pawls 22, 24 with the tips of the locking toothings 26a, 28a in blocking action.

The function of the belt-sensitive actuating mechanism is illustrated in FIGS. 3a thru 3c. FIG. 3a shows the rest condition: in this condition the coupling pawl 34 is maintained in contact with an abutment pin by a compression spring and out of engagement with the inner toothing of the coupling gearwheel 36. In high rotary acceleration of the belt reel 18 in the uncoiling direction the coupling pawl 34 on the side of the control disk is swivelled, causing it to engage the inner toothing of the coupling gearwheel 36, so that the latter is now free to turn with rotation of the belt reel 18. Via the projection 36a on the coupling gearwheel 36 the pin 40 engaging the slot 36d of the latter is, at the same time as the control pawl 38, forced upwards so that said control pawl engages the locking toothing 28a. With further rotation of the belt reel 18 the locking pawls 22, 24 are now swivelled in the same way as already described for vehicle-sensitive actuation and caused to engage the locking toothings 26a, 28a.

When, in a blocking situation, as shown in FIG. 3c, a high tensile force F is exerted on the belt webbing B the bearings of the belt reel yield in the caps 12, 14 so that the flanges 18a, 18b of the belt reel 18 come into contact with the inner circumference of the strips 10e, 10f of the shell section 10 via the locking toothings 26a, 28a. With a further increase in load the belt reel is now caused to be supported by the part of the shell section 10 surrounding it, the strips 10e, 10f of the latter being engaged around the locking toothings 26a, 28a in the manner of a band brake. The thereby resulting friction greatly reduces the blocking load on the locking pawls 22, 24, thus enabling them to be designed for reduced strength so that it is possible for them to be made of plastic. Since the blocking load is furthermore distributed very evenly around the circumference of the belt reel 18 it too can be designed with a comparatively reduced strength, thus opening up new possibilities for savings in material and weight. High forces occur only in the band-shaped shell section 10. Since the shell section 10 is subjected practically exclusively to tensile loading the desired high ultimate load can already be achieved by a wall thickness which—at the most—is half as much as that of housings employed on conventional belt retractors.

What is claimed is:

1. A seat belt retractor comprising a housing and a belt reel mounted in said housing for rotation about an axis, said belt reel having axially spaced flanges at least one of which is provided with an external locking toothing and said housing comprising a base plate and a band-shaped shell section which has first and second ends connected to said base plate to form a closed loop extending around at least one of said flanges, said base plate having a through-hole for a securing screw, and said belt reel being mounted in bearings which yield under load to permit said flanges to bear on said shell section.

2. The seat belt retractor of claim 1, wherein said shell section is formed by a pair of axially spaced strips each extending around one of said flanges.

3. The seat belt retractor of claim 1, wherein said shell section is bent from a piece of stamped metal sheet.

4. The seat belt retractor of claim 2, wherein said shell section is bent from a piece of stamped metal sheet in the shape of a generally rectangular elongate frame the longer sides of which form said axially spaced strips and the shorter sides of which are placed on one another and connected together to form said base plate.

5. The seat belt retractor of claim 2, wherein said strips are interconnected by at least one transverse web.

6. The seat belt retractor of claim 5, wherein said web is channel-shaped in cross-section.

7. The seat belt retractor of claim 1, wherein said shell section defines a generally cylindrical space for accommodation of said belt reel with a prism-shaped radial extension for accommodation of a pair of swivably mounted locking pawls each cooperating with a locking toothing on an associated one of said flanges.

8. A seat belt retractor comprising a housing and a belt reel mounted in said housing for rotation about an axis, said belt reel having axially spaced flanges at least one of which is provided with an external locking toothing and said housing comprising a base plate and a band-shaped shell section which has first and second ends connected to said base plate to form a closed loop extending around at least one of said flanges, said shell section defining a generally cylindrical space for accommodation of said belt reel with a prism-shaped radial extension for accommodation of a pair of swivably mounted locking pawls each cooperating with a locking toothing on an associated one of said flanges, and said locking pawls, under load, bearing on said shell section.

9. The seat belt retractor of claim 8, wherein said shell section has two opposed axial ends and a cap is fitted on each axial end of said shell section.

10. The seat belt retractor of claim 9, wherein said belt reel is mounted in a pair of bearings and each of said caps has one of said bearings.

11. The seat belt retractor of claim 8, wherein said locking pawls are interconnected by a rigid transverse web.

12. A seat belt retractor comprising a housing and a belt reel mounted in said housing for rotation about an axis, said belt reel having axially spaced flanges at least one of which is provided with an external locking toothing and said housing comprising a base plate and a band-shaped shell section which has first and second ends connected to said base plate to form a closed loop extending around at least one of said flanges, each of said flanges having a peripheral ring provided with said locking toothing, and each of said peripheral rings externally defines a cylindrical space for accommodation of functional parts of said retractor.

13. A seat belt retractor comprising a housing and a belt reel mounted in said housing for rotation about an axis, said belt reel having axially spaced flanges at least one of which is provided with an external locking toothing and said housing comprising a base plate and a band-shaped shell section which has first and second ends connected to said base plate to form a closed loop extending around at least one of said flanges, said shell section defining a generally cylindrical space for accommodation of said belt reel with a prism-shaped radial extension for accommodation of a pair of swivably mounted locking pawls each cooperating with a locking toothing on an associated one of said flanges, one of said locking pawls being provided with a recess accommodating a swivable control pawl associated with an inertial sensor body, said locking pawl having a window opposite a corresponding locking toothing of an associated flange, said control pawl being movable through said window and into engagement with said locking toothing.

14. The seat belt retractor of claim 13, wherein an internally toothed coupling wheel is mounted for limited rotation about said axis, a webbing-sensitive mechanism being provided for selectively coupling said belt reel and said coupling wheel for joint rotation, said coupling wheel having a radial extension with a slot therein, and said control pawl carrying an axial pin having a free end engaged into said slot.

\* \* \* \* \*